UNITED STATES PATENT OFFICE.

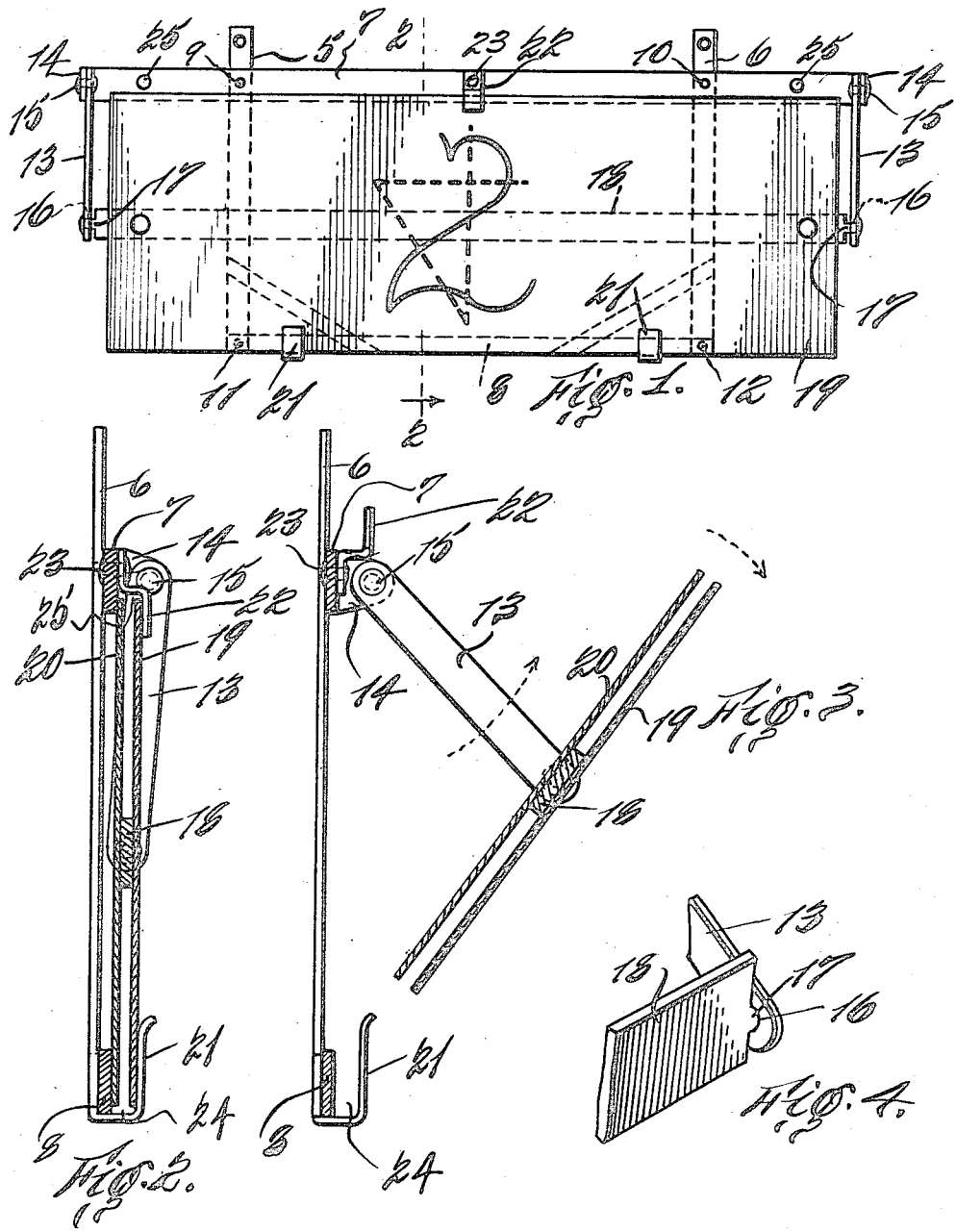

WILLIAM F. REILLY, OF NEW YORK, N. Y.

LICENSE-PLATE HOLDER.

1,259,555.

Specification of Letters Patent.  Patented Mar. 19, 1918.

Application filed August 22, 1917. Serial No. 187,585.

*To all whom it may concern:*

Be it known that I, WILLIAM F. REILLY, a citizen of the United States of America, residing at the State of New York, city and county of New York, have invented certain new and useful Improvements in License-Plate Holders, of which the following is a full, clear, and exact description.

This invention relates to improvements in license pad holders or brackets for motor vehicles the object being to provide such a holder arranged to support a plurality of license pads in such manner as to expose to view but one pad at a time. The chief object of my invention is to provide a license pad holder arranged to support license pads of different States and arranged so that either of the license pads can be moved into view without the necessity of removing same from the vehicle. To carry my invention into practice, I provide a suitable frame work which pivotally supports a bar. To opposite faces of the bar I secure the license pads. One face of the bar may have secured thereto a license pad for New York State for instance, a license pad for New Jersey being secured to the opposite face of the bar. When passing out of one of the above mentioned States into the other, it is but necessary to reverse the position of the two pads, causing the inner pad to become exposed to view and concealing the other pad. That is to say, the pad for the State entered will be exposed to view while the pad of the State left will be concealed.

I will now proceed to describe my invention in detail, the novel features of which I will point out in the appended claims reference being had to the accompanying drawing forming part hereof, wherein—

Figure 1 is a face view of my improved license pad holder, same being illustrated as supporting two pads;

Fig. 2 is a vertical sectional view the section being taken on a line 2—2 in Fig. 1;

Fig. 3 is a similar view illustrating the manner of causing the pads to change places; and Fig. 4 is a fragmentary detail view in perspective.

As herein illustrated, my improved license pad holder consists of a suitable frame work consisting of vertical members 5 and 6 and horizontal members 7 and 8 secured thereto at 9, 10, 11 and 12.

To each end of the upper horizontal frame member 7 I pivotally secure one end of an arm 13, said frame member being bent over at each end to form a bracket 14 to receive the pivot 15 which in this instance consists of a rivet.

The free end of each arm 13 is provided with an opening 16 to receive a trunnion 17 carried by a cross-bar 18, (see Fig. 4). The outer end of each trunnion 17 is upset to form a head to retain the cross-bar or license pad holder 18 in place. The numerals 19 and 20 indicate license pads or plates of two different States while the numerals 2 and 4 thereon indicate license numbers. It will be seen by referring to Fig. 1 that the plates 19 and 20 are secured to the pivotally mounted cross-bar 18 in reversed position for the reason that the plates have to be rotated one hundred and eighty degrees in order to reverse the plates or cause them to change positions. Should I leave the State of which plate 19 is the license plate for the State of which plate 20 is the license plate, I would merely turn the plates over causing plate 20 to occupy the position formerly occupied by plate 19.

A further feature of my invention consists of means for retaining the license plates in position against the frame. To accomplish this result I provide fixed lips 21 and a movable latch 22 pivotally connected to the horizontal frame member 7 at 23. The lips 21 are offset from the frame to provide a pocket 24 to receive the plates, as shown in Fig. 2. The latch 22 is also offset from the frame to provide a similar pocket 25.

When it becomes necessary to reverse the plates the latch 22 will be turned upon its pivot to the position shown in Fig. 3, after which the arms 13 can be swung outwardly, as indicated in Fig. 3, to a position which will permit of the rotation of the bar 18 and attached plates 19 and 20. After the plates have been rotated to change the position thereof the arms 13 can be moved inwardly toward the frame at the same time the lower edge of the plates will be guided into the pockets 24. After the lower edge of the plates have been guided into the pockets 24, the plates can be pushed to cause the inner plate to lie against the frame, after which the latch 22 can be moved back to its original position, as indicated in Fig. 2.

The above described mechanism obviates the necessity of removing plates when it becomes necessary to change said plates when passing from one State to another. The frame can be secured to a vehicle in any desired manner such for instance as by bolts passing through openings 25.

What I claim is:

1. A license plate holder consisting of a support, arms pivotally secured thereto, and a cross-bar pivotally connected to said arms arranged to retain a plurality of license plates.

2. A license plate holder consisting of a support, arms pivotally secured thereto, a cross-bar pivotally connected to said arms arranged to retain a plurality of license plates, and means to lock said plates in position against the support.

3. A license-plate holder consisting of a support arranged to be immovably secured to a vehicle, and an auxiliary support movably secured to the support first named and arranged to reversibly retain a plurality of license-plates back to back, the auxiliary support being arranged to normally retain the unused plate in an unexposed position, said auxiliary support being also arranged for movement away from the support first named to permit of the reversal of the said plates.

Signed at New York city, N. Y., this 18th day of August, 1917.

WILLIAM F. REILLY.

Witnesses:
EDWARD A. JARVIS,
ROSE PERLMUTTER.

Copies of this patent may be obtained for five cents each, by addressing the "Commissioner of Patents. Washington, D. C."